(No Model.) 2 Sheets—Sheet 1.
T. W. LEMIEUX.
TRANSMITTING POWER.
No. 397,506. Patented Feb. 12, 1889.
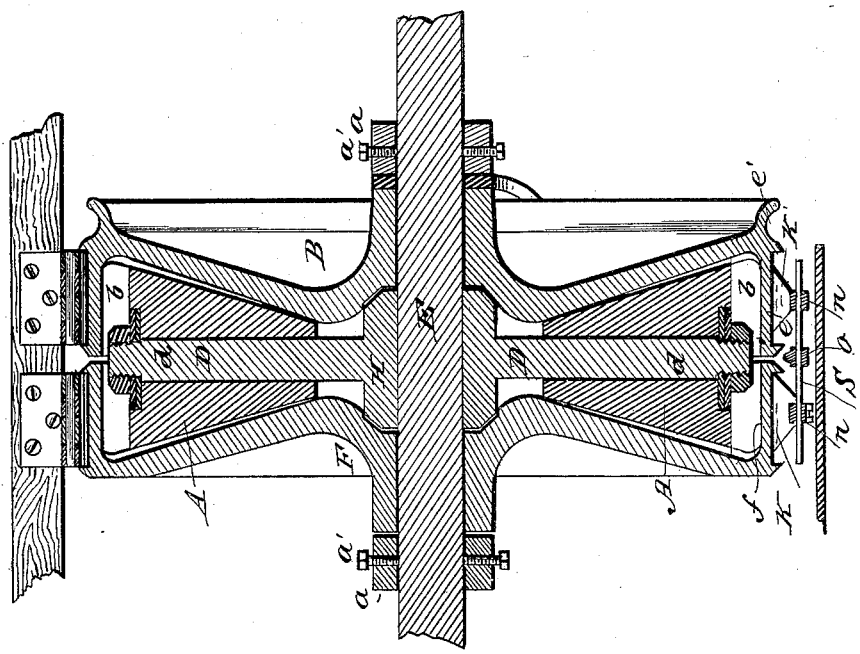
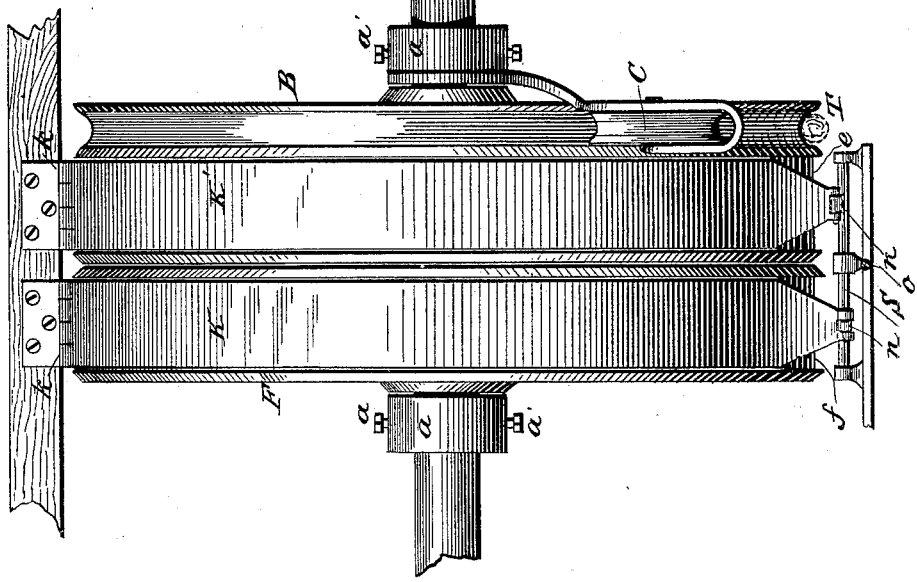
WITNESSES:
Fred G. Dieterich
Leon R. Kenmon
INVENTOR,
T. W. Lemieux
BY Munn & Co
ATTORNEY.

(No Model.) 2 Sheets—Sheet 2.
T. W. LEMIEUX.
TRANSMITTING POWER.
No. 397,506. Patented Feb. 12, 1889.
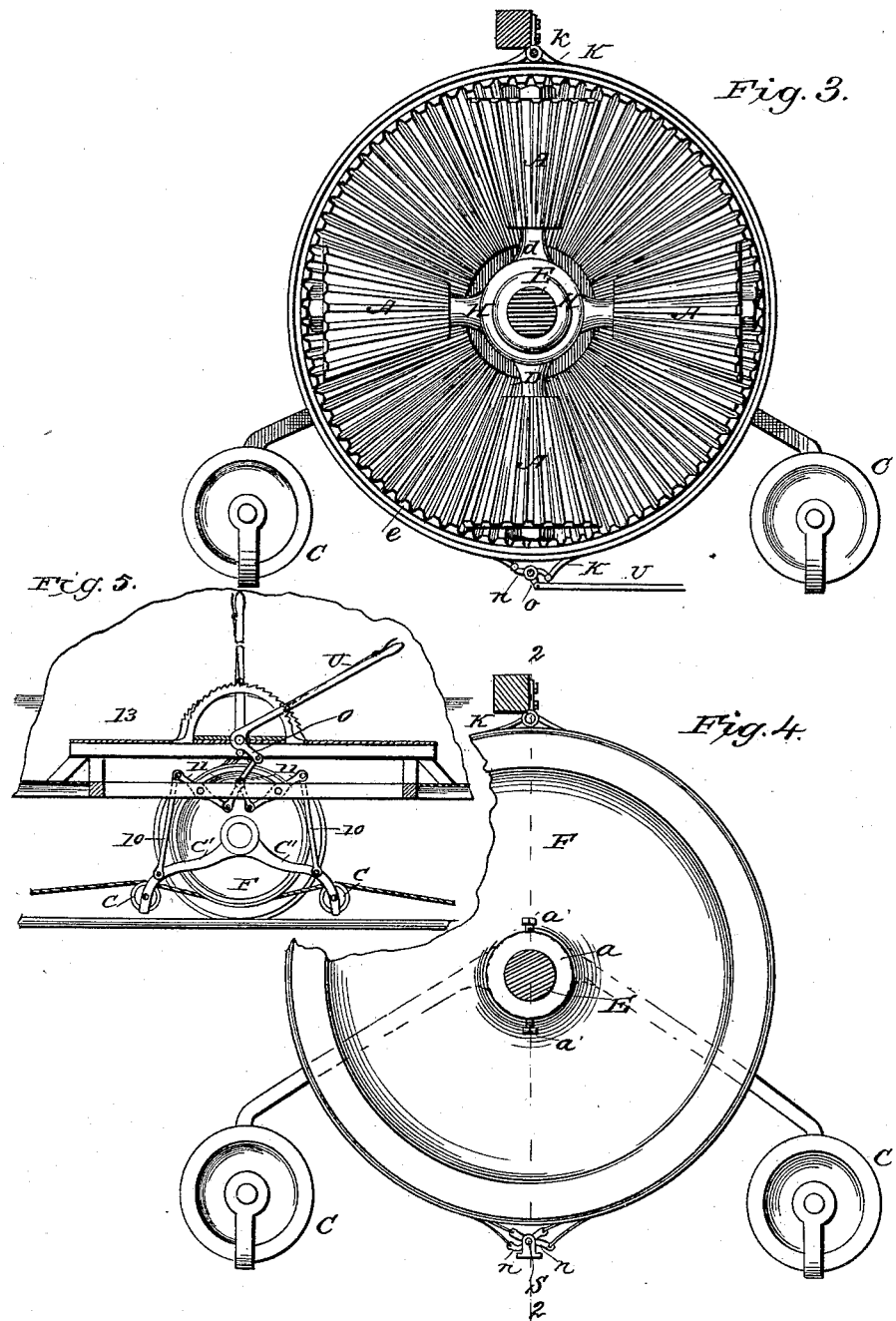
WITNESSES:
Fred G. Dieterich
John C. Kenion
INVENTOR
T. W. Lemieux
BY Munn & Co.
ATTORNEY

UNITED STATES PATENT OFFICE.

TIMOTHY W. LEMIEUX, OF DULUTH, MINNESOTA.

TRANSMITTING POWER.

SPECIFICATION forming part of Letters Patent No. 397,506, dated February 12, 1889.

Application filed March 26, 1888. Serial No. 268,525. (No model.)

*To all whom it may concern:*

Be it known that I, TIMOTHY W. LEMIEUX, of Duluth, in the county of St. Louis and State of Minnesota, have invented a new and useful Improvement in Devices for Transmitting Power, of which the following is a specification.

My invention consists of a device for the purpose of transmitting a reversible motion from a continuous running belt or cable to a wheeled vehicle, which can be readily adjusted and controlled by the operator on the car.

My invention is more especially adapted for use in connection with cable traction-railways, and has for its object to produce a device which will effectually operate as a means for reversing the moving direction of the car, and also act as a simple and positive gripping device in its connection with the cable and the car.

My invention further consists in the peculiar construction and combination of parts, as will be hereinafter fully described, and particularly pointed out in the claims.

In the accompanying drawings, Figure 1 is an end or front view of my invention. Fig. 2 is a longitudinal vertical section on line 2 2, Fig. 4. Fig. 3 is a side elevation, the bandwheel F being omitted, and showing the relative position of the intermediate gears, &c. Fig. 4 is a side view of the same with the band-wheel F in place, and Fig. 5 is a detail view of the device as applied to a car-body.

In the drawings, E denotes the power-shaft, which may be one of the axles of the vehicle, upon which is loosely mounted the bandwheel B. The inner face of this wheel is beveled and formed with a cogged surface, and is provided with a wide circumferential flange, e, and a circumferential groove, e', adapted to receive the cable T. A band-wheel, F, is loosely mounted upon the shaft E. This wheel is similar to the wheel B, except that it is formed without the groove e'. The flanges e f of the wheels B and F face each other, thereby forming interior chamber, b.

H is a hub keyed to the shaft E centrally between the wheels F B, said wheels resting closely against the hub, and are held in such position by means of the collars a a and set-screws a' a'.

Strongly secured or cast integral with the hub H are four radial arms, D, forming pivot-bolts d, and upon these bolts are loosely mounted, so as to revolve thereon, four beveled gear-wheels, A, which mesh with the internal beveled cog-surfaces of the band-wheels B and F, as shown in Fig. 2.

K K' represent band-brakes adapted to operate the wheels B and F. The brakes K K' are preferably formed each of two sections, having a hinged connection, as at k k, to the framing of the machine. The band-brakes K K' pass around the circumference of the band-pulleys F and B, and have their lower end connected to a rock-shaft, S, journaled in the framing of the machine. It is preferred to connect said band-brakes to the shaft S by means of S-shaped purchases n n, which are arranged to project in different planes from the shaft, and have the opposite ends of the band-brakes secured to the opposite ends of the purchases n n.

The shaft S is provided with a short crank-arm, o, connected to it centrally between the purchases n n, and to said crank-arm is connected the adjusting-lever U, as shown. Thus it will be seen that one complete movement of the adjusting-lever U will tend to release the brake from one band-wheel and at the same time apply the brake to the other band-wheel, and thereby reverse the motion of the car. If, however, it is desired to stop the car, it is but necessary to move the lever U but partially, which movement would release the brakes from both band-wheels, and thereby permit the car to stop. This operation may be effected gradually or suddenly, at the will of the operator.

C C are two small sheaves journaled in the outer ends of two arms, C' C', pivotally supported from the axle E. Upon the sheaves C C is supported the cable T, as shown, which cable, through the medium of the sheaves C C, is brought into frictional contact with the pulley B when it is desired to run the car.

Any suitable means may be employed for raising and lowering the sheaves C C. In Fig. 5 of the drawings I have shown one way of accomplishing such result. The same consists in pivotally attaching to each of the arms C' C' a long arm, 10, and to connect said arms 10 by means of a series of toggle-levers, 11, mounted upon the body of the car 13. Upon the body of the car 13 is also mounted the lever U, the lower end of which is connected to the crank-arm o, as before described.

From the foregoing description, taken in connection with the drawings, it will readily appear that as the cable passes forward under the large wheel B it will give it a backward revolving motion, and since the beveled gear-wheels A mesh into the cogged surfaces of the band-wheel B, (the band-wheel F being at this time held from revolving by its band-brake K being applied,) the motion of the band-wheel B will cause the gear-wheels A to travel on the surface of the gear-wheel F, thereby causing the pivot-bolts D to move in the same direction as the wheel B, and thus revolve the shaft E in a direction opposite to that of the moving cable. Now, when the wheels of the car are either fastened to the shaft E or driven by means of a belt or gear from it, the shaft revolving in a backward direction will revolve the wheels in the same direction.

To obtain a forward movement of the car, I apply the band-brake K' to the band-wheel B and release the brake from the wheel F. Then by raising the cable and bringing it into a tight frictional contact with the band-wheel B (the same being held by the brake-band from turning) the same will be united to the cable, and thus form an effectual grip, and thereby pull the car forward in the same direction as the moving cable.

From the foregoing description, taken in connection with the drawings, the operation of the invention will be readily understood.

While I have shown my improvement as applied to a car, it is manifest that in its practical application the same may be used in various kinds of machinery, such as hoisting, &c.

Having thus described my invention, what I claim, and desire to secure by Letters Patent, is—

1. In a device for transmitting a reversible motion to a car from a continuous running cable, the combination, with a shaft journaled below the car-body and having a hub keyed on said shaft provided with radial pivot-bolts D, and beveled gears mounted on said bolts D, of the band-wheels B and F, loosely mounted on said shaft and having internal beveled cogged surfaces, said wheel B adapted to be engaged by the cable, substantially as described.

2. In a device for transmitting a reversible motion from a continuous running cable, the combination, with shaft E and the band-wheels B and F, loosely mounted thereon, of the hub H, having radial arms D and beveled gears A mounted thereon, said hub adapted to be secured to said shaft and disposed between the wheels F and B, substantially as and for the purpose described.

3. In a device for transmitting reversible motion, the combination, with the shaft having radial arms D, carrying beveled gears A, of the band-wheels B and F, having internal beveled cogged surfaces and disposed one at each side of the radial arms D and meshing with the gears A, said wheels B and F having circumferential flanges adapted to receive the brake-bands, substantially as shown and described.

4. In a device, substantially as described, for transmitting a reversible motion, the band-wheel B, provided with an internal beveled cog-surface, a brake-flange, e, and a groove, e', adapted to receive the cable, substantially as described, and for the purpose specified.

5. In a device for transmitting a reversible motion, the combination, with the shaft E and the hub H, having radial arm D, provided with beveled gears A, of band-wheels B and F, the wheel B adapted to frictional contact with the cable, said wheels having beveled inner cogged surfaces meshing with the gears A, said wheels provided with flanges e and f, adapted to receive the brake-bands K K', and means for operating said brakes, substantially as described, all arranged as and for the purpose set forth.

TIMOTHY W. LEMIEUX.

Witnesses:
JAMES A. BOGGS,
RUFUS H. REDMAN.